US008113752B2

(12) United States Patent
Bullock (10) Patent No.: US 8,113,752 B2
(45) Date of Patent: Feb. 14, 2012

(54) CARGO RESTRAINT SYSTEM WITH ENHANCED PEEL STRENGTH

(76) Inventor: Matthew Bullock, McLean, VA (US)

( * ) Notice: Subject to any disclaimer, the term of this patent is extended or adjusted under 35 U.S.C. 154(b) by 241 days.

(21) Appl. No.: 12/486,897

(22) Filed: Jun. 18, 2009

(65) Prior Publication Data

US 2010/0322736 A1    Dec. 23, 2010

(51) Int. Cl.
*B61D 45/00* (2006.01)
(52) U.S. Cl. ......................................... 410/97
(58) Field of Classification Search ............. 410/32, 410/34, 36, 42, 96, 97, 100, 155; 220/1.5; 206/410, 597; 53/399, 441, 462, 556; 248/499
See application file for complete search history.

(56) References Cited

U.S. PATENT DOCUMENTS

| | | | |
|---|---|---|---|
| 1,705,060 A | 3/1929 | Hintz | |
| 2,269,286 A | 1/1942 | Ott | |
| 3,547,457 A | 12/1970 | Langer | |
| 3,612,463 A | 10/1971 | Grant | |
| 3,848,889 A | 11/1974 | Sharrow | |
| 3,897,919 A | 8/1975 | Weingarten | |
| 3,910,558 A | 10/1975 | Brucker et al. | |
| 4,054,226 A | 10/1977 | Bjelland et al. | |
| 4,111,132 A | 9/1978 | Plut | |
| 4,264,251 A * | 4/1981 | Blatt | 410/100 |
| 4,553,888 A | 11/1985 | Crissy et al. | |
| 4,640,853 A | 2/1987 | Schmeal et al. | |
| 4,846,610 A | 7/1989 | Schoenleben | |
| 4,964,771 A | 10/1990 | Callihan | |
| 5,037,256 A | 8/1991 | Schroeder | |
| 5,062,751 A | 11/1991 | Liebel | |
| 5,086,038 A | 2/1992 | Naef et al. | |
| 5,132,156 A | 7/1992 | Trassare, Jr. et al. | |
| 5,139,842 A | 8/1992 | Sewell | |
| 5,219,251 A | 6/1993 | Kanczuzewski | |

(Continued)

FOREIGN PATENT DOCUMENTS

EP    1 184 436 A1    3/2002

(Continued)

OTHER PUBLICATIONS

"Superior equipment capacity spurs B.C. paper maker's switch to CP Rail," CP Rail Report, Sep./ Oct. 1989, p. 1.

(Continued)

*Primary Examiner* — H Gutman
(74) *Attorney, Agent, or Firm* — Bradford Kile; Kile Park Goekjian Reed & McManus (57) ABSTRACT

A cargo restraint system and method with enhanced peel strength characteristics the restraint system including laminated load restraining strips with a layer of adhesive to adhere the restraining strip to a container wall surface having a thickness of approximately greater than 1.6 and less than 3.0 millimeters. The load restraint method for securing cargo within transport containers wherein an angle θ of attachment between a side wall of a container and a reinforcing strip of material attached to the side wall is maintained at approximately 15 degrees or less in accordance with the formula B≦cot θ•A, where θ is the angle formed between an exterior surface of said load restraining strip and an interior plane of the lateral wall surface of the transport container "A" is the distance from a front edge of a load to an adjacent side wall and "B" is the distance along the wall of the container behind the point of contact of the restraining strip with an edge of the load to be restrained.

18 Claims, 7 Drawing Sheets

U.S. PATENT DOCUMENTS

| | | |
|---|---|---|
| 5,431,284 A | 7/1995 | Wilson |
| 5,484,643 A | 1/1996 | Wise et al. |
| 5,516,244 A | 5/1996 | Baka |
| 5,568,636 A | 10/1996 | Koford |
| 5,595,315 A | 1/1997 | Podd et al. |
| 5,784,761 A | 7/1998 | Allen |
| 5,846,038 A | 12/1998 | Bostelman |
| 5,855,459 A | 1/1999 | Krier et al. |
| 5,947,666 A | 9/1999 | Huang |
| 6,089,802 A * | 7/2000 | Bullock .......... 410/97 |
| 6,227,779 B1 * | 5/2001 | Bullock .......... 410/98 |
| 6,368,036 B1 * | 4/2002 | Vario .......... 410/98 |
| 6,419,434 B1 | 7/2002 | Rahn |
| 6,435,787 B1 | 8/2002 | John |
| 6,527,488 B2 | 3/2003 | Elze et al. |
| 6,533,513 B2 | 3/2003 | Kanczuzewski |
| 6,568,636 B2 | 5/2003 | Fitzgerald et al. |
| 6,607,337 B1 * | 8/2003 | Bullock .......... 410/97 |
| 6,702,532 B1 | 3/2004 | Throener |
| 6,758,644 B1 * | 7/2004 | Vick .......... 410/100 |
| 6,896,459 B1 * | 5/2005 | Bullock .......... 410/97 |
| 6,923,609 B2 * | 8/2005 | Bullock .......... 410/97 |
| 6,981,827 B2 * | 1/2006 | Bullock .......... 410/100 |
| 7,018,151 B2 * | 3/2006 | Bullock .......... 410/97 |
| 7,066,698 B2 * | 6/2006 | Bullock .......... 410/97 |
| 7,290,969 B2 * | 11/2007 | Bullock .......... 410/97 |
| 7,329,074 B2 * | 2/2008 | Bullock .......... 410/97 |
| 2003/0206782 A1 | 11/2003 | Toglia |
| 2005/0123368 A1 | 6/2005 | Bullock |
| 2005/0123369 A1 | 6/2005 | Bullock |
| 2006/0198712 A1 | 9/2006 | Bullock |
| 2006/0257224 A1 | 11/2006 | Bullock |

FOREIGN PATENT DOCUMENTS

| | | |
|---|---|---|
| WO | 93/01979 A1 | 2/1993 |
| WO | 2005/063477 A1 | 7/2005 |

OTHER PUBLICATIONS

"Reduce Damage to Bags," Modern Railroads, Apr. 1954, pp. 143-144.

"Hexacomb kraft honeycomb: Pactiv Panels" Sales Brochure, Copyright 1996.

TY-GARD Sales Brochure, Walnut Industries, at least as early as 1998.

TY-GARD Freight Restraint System Sales Brochure, Walnut Industries, at least as early as 1998.

* cited by examiner

CARGO RESTRAINT SYSTEM WITH ENHANCED PEEL STRENGTH

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; U.S. Pat. No. 6,896,459 issued on May 24, 2005; U.S. Pat. No. 6,923,609 issued on Aug. 2, 2005; U.S. Pat. No. 7,018,151 issued on Mar. 28, 2006; U.S. Pat. No. 7,066,698 issued on Jun. 27, 2006; U.S. Pat. No. 7,290,969 issued on Nov. 6, 2007; U.S. Pat. No. 7,329,074 issued on Feb. 12, 2008 and United States Bullock application for patent entitled "Cargo Restraint Method and System With Enhanced Shear Strength" Ser. No. 12/481,345 filed on Jun. 9, 2009. All of the above are of common inventorship as the subject application. These patents and application have not been assigned by the inventor.

BACKGROUND OF THE INVENTION

This invention relates to an improved system and method for restraining cargo during transportation. More particularly, this invention relates to a novel system and method for securing and restraining undesired movement of drums, boxes, rigid and flexible containers, palletized or not palletized, within the interior of a container for sea, air rail or overland transport. Moreover this invention relates to a system and method of enhanced securement, attachment and strength to reduce load shifting during transport.

Most shipments for export, both in the United States and abroad, are placed within intermodal containers. Intermodal containers are often loaded with cargo in containment isolation enclosures such as boxes, fifty five gallon closed head drums, super sacks or plastic reinforced bags, plastic wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a result of ship, aircraft, railcar, or truck changes in motion.

Intermodal containers generally have standardized dimensions of twenty or forty feet in length and are fabricated with steel, corrugated sidewalls which are structurally self-supporting and very rugged. The containers can be stacked onto ships for ocean transport and are subjected to wave forces including: yaw, pitch, heave, sway, and surge. Each of these forces has the potential to apply substantial forces on the contents within the intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

For air travel, although commercial passenger flights avoid air turbulence, in some instances rough weather is not avoidable. Moreover, cargo transport, per se, when passengers are not involved, might use the most direct route regardless of weather conditions.

On overland routes intermodal containers are often "piggybacked" onto railroad flat cars and/or truck trailers. Rail cars may be made up by a coupling or humping process within a switching yard. When a railroad car is rolled into a stationary string of cars, the impact causes the car couplings to lock together with a jolt. This impact can apply a impact force to cargo within the rail car. Moreover, during transport, railway cars are subject to braking forces, run-in and run-out, coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

When cargo contacts the interior walls or doors of a container, the force necessary to reduce its momentum to zero must be absorbed by the goods and/or the container. Such forces can result in damage to cargo, damage to interior walls or doors of the container, damage to cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage, load containment enclosures are often secured to the floor and/or sides of the intermodal container, boxcar or trailer by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a truck trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with or 'touch" rear container doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized. Additionally some partial loads are not symmetrically positioned on a pallet and securement must therefore accommodate an asymmetric load.

In the past, various dunnage materials have been utilized within intermodal containers, rail cars, and/or trailers to eliminate unwanted movement or shifting of a load during transport. The boxes, drams, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires skilled carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked within a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing.

The Department of Transportation has established a standard to determine if a particular restraint system is capable of adequately securing hazardous cargo. In certain instances, conventional load-locking and lumber bracing has not been structurally rugged enough to receive approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading within intermodal containers, air transport containers, boxcars, truck trailers, and the like that is functionally effective, cost-efficient, labor-efficient, and able to comply with Department of Transportation and Bureau of Explosives regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common ownership with the subject application. The invention disclosed in that patent comprises sealing strips that are adhered to opposing sidewalls of a container, an integral strip of bracing is material, and a joining mechanism are used to bind the ends of the strips together into a secure and taut restraint across the face of a load.

In the '251 patent, noted above, flexible securement strips are applied in a manner somewhat similar to banging wallpaper, wherein an adhesive is applied onto a surface within a trailer where adhesion is desired. Then a retaining strip is applied to the adhesive. In addition to this requirement of a separate adhesive, systems appearing in the past sometimes encounter problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779; 6,607,337; 6,896,459; 6,923,609; 7,018,151; 7066,698; 7,290,969; and 7,329,074 and application Ser. No. 12/481,345 filed on Jun. 9, 2009 and entitled "Cargo Restraint Method and System With Enhanced Shear Strength" all of common inventorship and ownership as the subject application. The disclosures of these prior patents and application are hereby incorporated by reference as though set forth at length.

Further to these prior systems of securing lading in intermodal containers increasing attention has been placed on securing heavier and denser loads, including hazardous materials, without abandoning the advantages achieved by previously known commercial systems. Moreover, there is interest in decreasing the elastic and/or plastic elongation and enhancing the vertical securement function so that hazardous materials can be transported with enhanced efficiency and security. In this regard it would be desirable to utilize an eighty, fifty five gallon, drum load within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors of a container is not acceptable according to HazMat regulations.

In addition to the above, other restraining systems known in the past required multiple elements which were cumbersome to store, arduous to install, and often required a degree of skilled labor to properly install. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

Further systems and procedures used in the past relying on accessories located within the cargo container often were not able to secure a partial load. That is, if the load does not extend to the front or rear of the container, such as a centrally located load, the necessary anchors may not be available in an area where they can be effectively used.

Methods and systems appearing in the past require application of a five foot length of self-adhering contact by a restraining strip with the side walls of a container. It would be desirable if this length could be reduced while concomitantly retaining secure operative attachment of the cargo restraining strips to the side walls of the container.

Systems and methods previously know exhibit a potential for unintended release and/or detachment by peeling of the restraining strip away from a sidewall of a cargo container during transport even under axial loading of the restraining strips due to an angle that exists between an outer edge of the face of a load and a container side wall and the land and valley undulating surface of a conventional intermodal container side wall surface. While release of a restraining strip following transport by peeling is a desirable attribute of a functioning restraint system release by unintended peeling during transport is not.

The limitations suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within an intermodal container, or the like, which will obviate or minimize problems and concomitantly achieve at least some of the desired aspects of lading securement of the type previously described.

It is another general object of the subject invention to judiciously protect cargo from damage during transport and to provide enhanced securement of a load within a container while minimizing shifting of a container load.

It is a specific object of the invention to provide a securement system and method for an intermodal container, and the like, with enhanced securement and peel resistance with respect to the sidewalls of an intermodal container, air container, rail car, trailer and the like during transport.

It is a related object of the invention to provide a securement system and method for an intermodal container, and the like, where the amount of load travel for a given level of impact is minimized.

It is another object of the subject invention to reduce the material and labor costs involved in securing lading within an intermodal container, and the like.

It is a particular object of the subject invention to provide a method for securing cargo that is self-contained and may be installed quickly, reliably, and efficiently by relatively unskilled labor, even in intermodal containers having corrugated walls.

BRIEF SUMMARY OF THE INVENTION

One preferred embodiment of the invention comprises a system and method of restraining cargo within a container including a laminated load restraining strip comprising a flexible strip having a first side and a second side and a first end and an second end. A first layer of adhesive coextensively extends along and coats the second side of the flexible strip from the first end to the second end of the strip. A layer of reinforcement is adhered by the first layer of adhesive and is coextensive with the length of the flexible strip.

A second layer of adhesive extends along and coats a portion of the layer of reinforcement at the second end of the laminated load restraining strip and the thickness of this second layer of adhesive is approximately greater than 1.9 millimeters and less than 3.0 millimeters. A release layer is applied coextensively over the second layer of adhesive for storage and distribution purposes and the release paper or layer may be removed from the second layer of adhesive and the laminated load restraining strip being operable to be releasably affixed to a side wall surface of a cargo container on site, with enhanced peel strength characteristics.

A first method for applying the laminated load restraining strip to a side wall of a transport container for use in securing cargo within the transport container includes the steps of providing a load restraining strip have a first end and a second end and a segment at the second end is provided with a self-adhering coating having a thickness greater than approximately 1.6 millimeters and less than approximately 3.0 millimeters for releasable attachment of the load restraining strip to a lateral wall surface of a transport container. The method includes determining the shortest distance "A" between an outer contact edge of the load adjacent to the lateral wall surface of the transport container and the lateral wall surface of the transport container.

The method further includes placing and securing the self adhering portion of the flexible load restraining strip against the lateral wall surface of the transport container where the self adhering portion of the strip is less than or equal to four feet in length and the step of placing and securing of the self adhering portion to the lateral wall surface begins at a distance "B" behind an imaginary extension of a contact edge of the load restraining strip with an outer edge near the face of the load. The imaginary extension being normal to the lateral wall surface of the transport container, where the length of:

B≦cot θ•A, where θ is the angle formed between an exterior surface of said load restraining strip and an interior plane of the lateral wall surface of the transport container and

θ≦15°.

THE DRAWINGS

Other objects and advantages of the present invention will become apparent from the following detailed description of preferred embodiments taken in conjunction with the accompanying drawings wherein.

DETAILED DESCRIPTION

Context of the Invention

Figure 1:
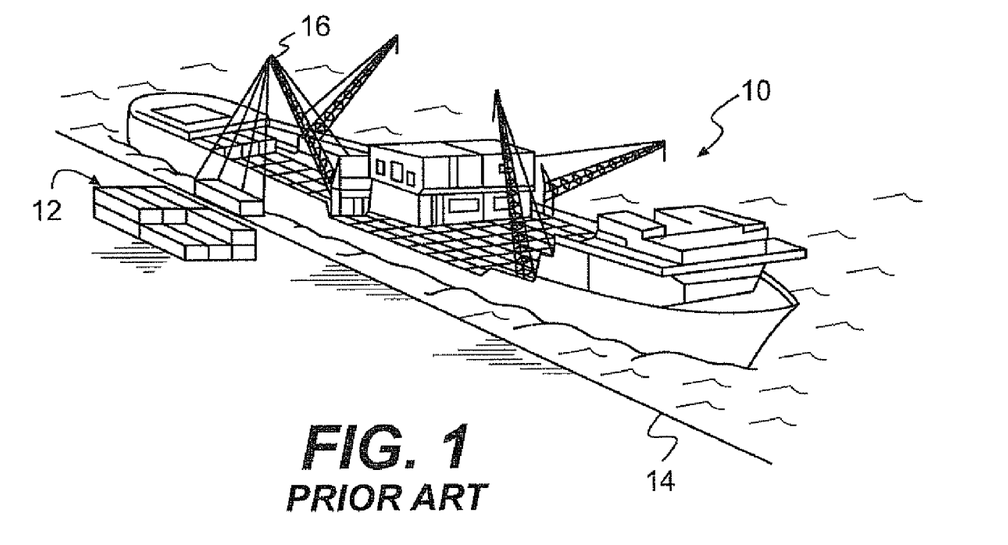
FIG. 1 is an aerial view of a schematic container ship at a dock with cranes lifting and loading intermodal containers onto the ship for ocean going transport.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 with cranes 16 lifting and loading the intermodal containers 12 to be stacked on the ocean going vessel 10. The subject invention may be advantageously used to secure cargo within intermodal containers, like the ones being loaded onto the ship 10, air transport containers, rail cars, truck trailers and the like.

Figure 2:
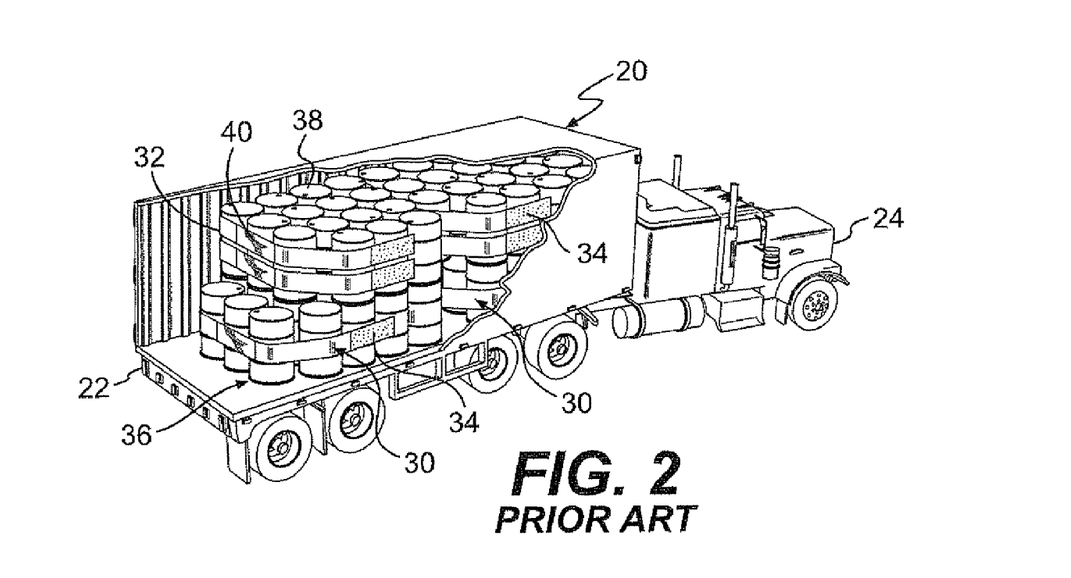
FIG. 2 is an axonometric view showing the interior of an intermodal container secured to a flatbed of a truck trailer, with a partial load secured within the container.

FIG. 2 is an axonometric view that discloses another operating environment of the invention. In this view an intermodal or cargo container 20 is shown mounted upon a trailer 22 which is operably towed by a tractor 24 for land transport. Containers such as these are also operable to be mounted on railway flat cars either directly or as attached to truck trailers 22.

A partially cut away portion of FIG. 2 depicts a cargo restraining strip 30 which is operable to be self-adhered to an interior wall surface 32 of the intermodal cargo container 20. The cargo securement system shown in FIG. 2 comprises a pair of opposing restraining strips 30 self-adhered to opposing side walls of the container 20 by the use of adhesive segments 34 that self adhere to opposing portions of the container side walls. The restraining strips 30 are wrapped around and embrace cargo 36, such as fifty five gallon drums 38. The restraining strips 30 overlap across the face of a load and are folded and drawn tightly together by a torque tool. Then an independent overlying patch segment 40 is applied to the junction to unite the opposing restraining strips 30 from the container side walls around cargo to secure the cargo to the interior wall surfaces of the container 20.

Figure 3:
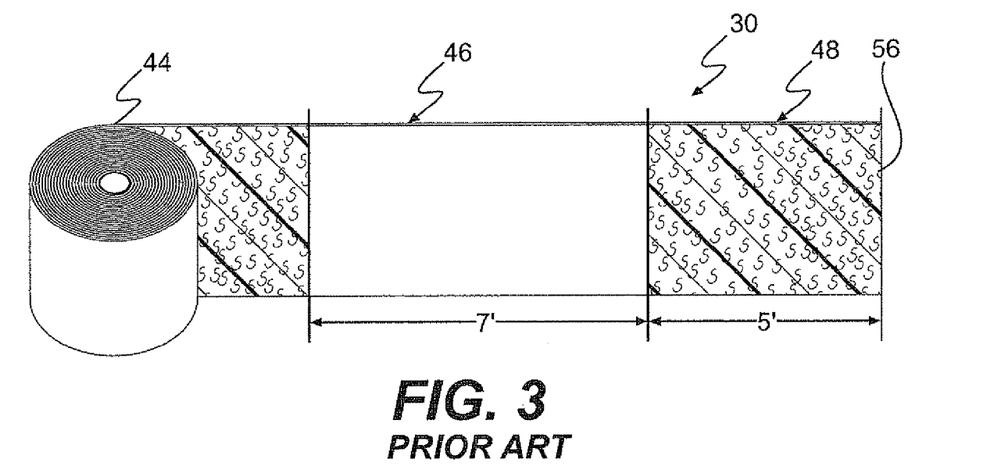
FIG. 3 is a pictorial view of a dispensing roll and a twelve foot length of a securement restraining strip of use in restraining cargo within an intermodal container.

Turning to FIG. 3, a general form of a restraining strip 30 such as illustrated in the related patents identified above. The restraining strips 30 are preferably manufactured and transported on reels or rolls 44. A roll 44 of strips 30 are manufactured in an end-to-end continuous fashion in lengths of approximately twelve feet composed with repeating reinforced construction.

An initial, approximately seven foot segment 46 is fabricated with a basic construction throughout the strip 30 and alternate approximately five foot segments 48 include an extra self-adhering adhesive component. In one embodiment the strips 30 are transversely perforated, at approximately twelve foot lengths, so that a strip 30 can be torn off. Alternatively one side of the strip is marked in twelve foot lengths and can be facially cut to create a single approximately twelve foot long restraining strip 30 for use on a job site. Preferably, the restraining strip 30 is approximately fifteen inches in width; however, other widths may be substituted depending on the need for additional strength, which a wider strip can provide.

Figure 4:
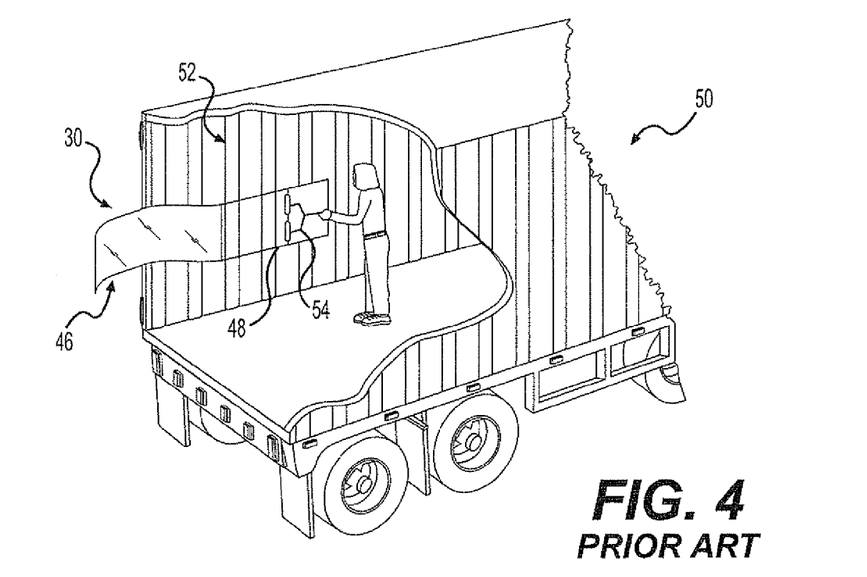
FIG. 4 is an axonometric segmental view partially broken away to disclose application of a conventional restraining strip to an interior wall surface of an intermodal container positioned on a truck trailer.
Figure 5:
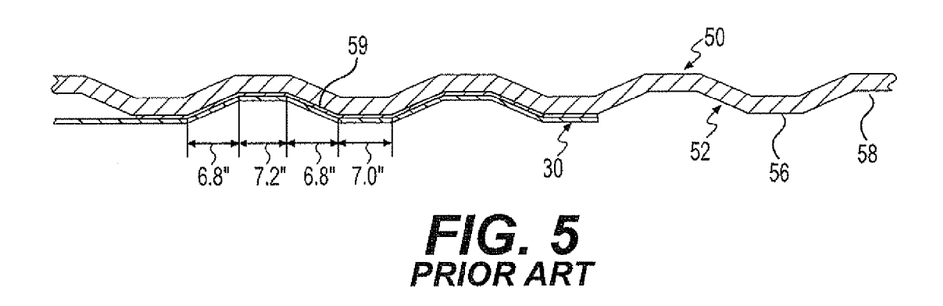
FIG. 5 is a detailed partial cross-sectional view of an intermodal container body showing the conventional length of an attachment of a restraining strip with the side wall of the container.

FIGS. 4 and 5 disclose views of an individual load restraining strip 30 applied in accordance with the inventor's technique of application of the strips to an intermodal container 50, or the like, side wall surface 52. In this, FIG. 4 shows a load restraining strip 30 being applied to the side wall 52 of the intermodal container 50. As taught in the related patents listed above the installer can use a rolling tool 54, or similar device, that is designed to assist the installer in securely adhere the strip 30 to an undulating surface of the intermodal container 50. The installer has peeled away a release paper 56 (note FIG. 3) from the self-adhering segment 48 of the load restraining strip 30 and is shown smoothing the strip against a sidewall of the intermodal container.

FIG. 5 is a cross-sectional view of an intermodal container side wall segment with a load restraining strip 30 applied in the manner shown in FIG. 4. The side wall interior surface 52 of the intermodal container 50 is composed of a repeating sequence of land surfaces 56 and valleys 58. Intermodal containers 50 are fairly standardized and one frequently used container 50 has a lateral land dimension of 7.0 inches, a first sloping surface with a lateral run of 6.8 inches, a valley base of 7.2 inches and a second sloping surface with a lateral length of 6.8 inches as shown in FIG. 5. The adhesive portion of the load restraining strip 30 is designed to cover three or four land surfaces 56 and two or three valleys 58.

The adhesive 59 is an acrylic that exhibits the characteristics of high tack and high shear strength and bonds well to metals. In addition the adhesive must have excellent high temperature and cold temperature characteristics so that the intermodal container can be shipped in all normal ambient operating conditions. Finally the adhesive should have low peel strength characteristics so that when the container is unloaded the load restraining strips 30 may be facilely removed by being peeled away from the side wall surfaces of the container by hand without leaving a residue.

Load Restraining Strips

Figure 6:
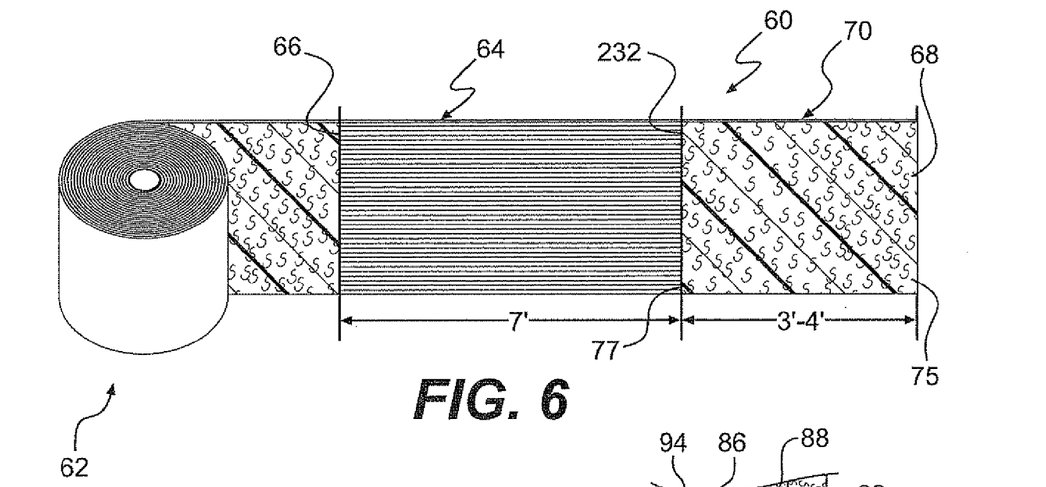
FIG. 6 is a view similar to FIG. 3 which discloses a preferred form of a restraining in accordance with one embodiment of the invention.
Figure 7:
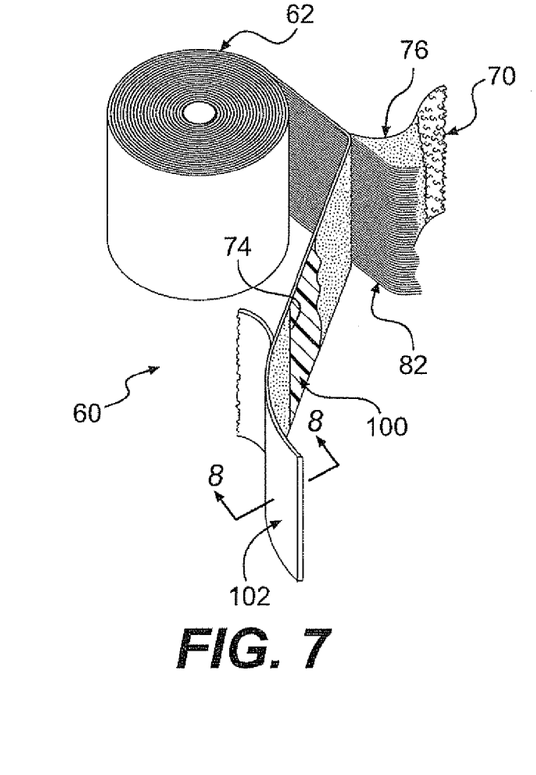
FIG. 7 is an axonometric view, partially broken away disclosing a roll of a restraining strip in accordance with one embodiment of the invention.
Figure 8:
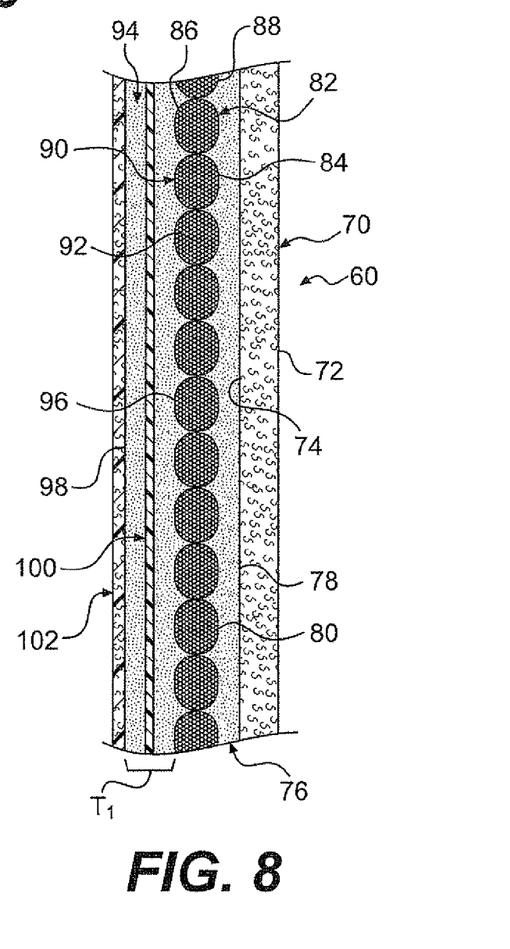
FIG. 8 is a cross-sectional detail view taken along section lines 8-8 in FIG. 7 and discloses details of an interior of one preferred form of a restraining strip for use in accordance with the invention.

Referring now to FIGS. 6 through 8 one preferred form of a high strength load restraining strip 60 in accordance with the subject invention is disclosed.

The restraining strips 60 are manufactured and transported on reels or rolls 62, note FIG. 6, in serial segments of ten to eleven feet in length. Each of the restraining strips 60 have a first end 66 and a second end 68 and an additional self adhering coating 70 for releasable attachment of the load restraining strip 60 to the sidewall of a container. The self-adhering coating or portion 70 being three to four feet in length as illustrated.

FIGS. 7 and 8 shows an expanded, partially redacted, view of the restraining strip 60 to disclose internal detail and the relative position of components of the restraining strip 60 in accordance with one embodiment of the subject invention. The restraining strip 60 includes a flexible spun bonded polyester strip 70 having a first or outer side 72 and a second or inner side 74 and a first end 66 and a second end 68 (note again FIG. 6) corresponding to the ends of the strip 60 such that the spun bonded strip 70 extends throughout the length of the restraining strip 60 of ten to eleven feet.

A first layer of adhesive 76 coextensively extends along and coats the second side 74 of the spun bonded polyester strip 70 from the first end 66 to the second end 68 of the spun bonded strip. The first layer of adhesive 76 has a first side 78 and a second side 80. As shown in FIGS. 7 and 8 the first side 78 of the adhesive layer 76 is in self-adhering contact throughout the second side 74 of the flexible spun bonded polyester strip 70.

A layer of reinforcement material 82 is provided having a first side 84 and a second side 86. In this embodiment of the invention the reinforcing material 82 comprises a plurality of substantially parallel longitudinal strands 88 grouped into bundles 90 that extend throughout the length of the restraining strip 60 in a substantially mutually parallel array. Accordingly each of the bundles 90 of the reinforcing material 82 is composed of a plurality of finer denier fibers 92 of reinforcement material such as for example polyester, glass fibers, and the like.

A second layer of adhesive 94 extends along and coats the second side of the layer of reinforcement material 82 from the second end 68 of the load restraining strip 60 to a position less that or equal to approximately four feet from the second end of the load restraining strip 60 (note again FIG. 6). In a preferred embodiment the length of the second layer of adhesive 94 is approximately three feet in length.

The second layer of adhesive 94 has a first side 96 overlaying and adhering to the second side 86 of the reinforcement material 82 and a second or outer side 98 for attachment to a side wall of a container. The thickness $T_1$ of the adhesive 94 is approximately between 1.6 and 3.0 millimeters and in a preferred embodiment is approximately 2.1 millimeters in thickness. It has been determined that this thickness of the second adhesive provides an enhanced resistance to unintended peel of the adhesive away from the container side wall during transport. At the same time upon delivery of the cargo and pulling of the restraining strip away from the container side wall in a direction approximately normal to the surface of the sidewall the adhesive will permit peeling removal of the restraining strip by hand.

Although a substrate may not be needed for the second adhesive layer 94 in the event a substrate is necessary or desirable a substrate 100 may be embedded within the second layer of adhesive 94 as shown in FIG. 8. The substrate 100 but may be composed of an acrylic sheet having a plurality of transverse holes or a resin differential polymer with holes to render the substrate porous, or VALERON® which may be fashioned in the form of a screen foundation. Companies such as DuPont, Hoeschst Celanese, and others manufacture such materials. Alternatively, the substrate 100 may not be porous and comprise a sheet of Mylar provided that the shear strength of the adhesive materials is sufficient to carry axial loading as discussed below.

A release material or paper 102 extends over the second or outer most side 98 of the second layer of adhesive 94. The release material 102 enables individual segments of the subject load restraining strip 60 to be manufactured and stored on a reel or core, as shown in FIGS. 6 and 7, and the release paper 102 is peeled off of the individual load restraining strips 60 on site so that the second layer of adhesive 94 may be used by an installer to affix the second end 68 of the load restraining strip 60 to a side wall, or other attachment surface, of a transport container.

The first and second adhesive layers 76 and 94 are composed of compositions that have a high shear strength, a wide operative temperature gradient—including cold weather tackiness and a specific gravity of less than one to displace moisture from the side walls of a container through capillary action. Adhesives of the type that are preferred are available from the Venture Tape Company of Rockland, Mass.

As noted above and shown particularly in FIG. 8 each of the bundles of reinforcement 82 are composed of a plurality of finer denier strands 92 of reinforcing materials. The reinforcement strands 92 may be composed of fine polyester fibers, polypropylene, polyethylene, polyolefin, glass fiber, aramids including Kevlar, carbon fibers, and the like. Kevlar is a polyamide in which all the amide groups are separated by para-phenylene groups. Kevlar is a registered trademark of the DuPont Company of Wilmington, Del. Individual strand bundles of reinforcement 82 are directly abutted against and adhered to the second surface 80 of the first adhesive layer 76 as shown in FIG. 8.

Figure 9:
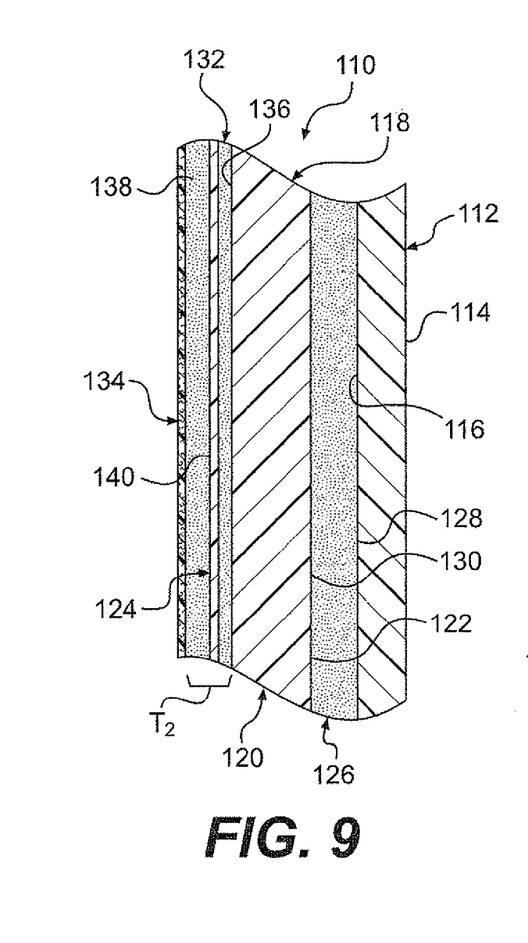
FIG. 9 is a partial cross-sectional view similar to FIG. 8 and discloses an alternative detail of the interior structure of another preferred form of a restraining strip for use in connection with the invention.

Turning now to FIG. 9 a partial cross-sectional view similar to FIG. 8 of an alternative preferred embodiment of a laminated load restraining strip 110 is shown. The restraining strip 110 includes a first flexible, monolithic, strip of material 112 having a first surface 114 and a second surface 116. The restraining strip 110 also includes a layer of reinforcement 118 comprising a second flexible, monolithic, strip of material 120 having a first surface 122 and a second surface 124. In this embodiment the two monolithic strips 112 and 120 are selected with a different thickness but similar composition. In an alternative embodiment the thickness of the strips may be the same or strip 112 may be thicker that strip 118.

The first and second monolithic strips 112 and 120 are preferably composed of an opaque or transparent composition of high strength polypropylene, high density polyethlene or low density polyethlene, polyethleneterephtalate, polyethleneterephtalate glycol, polyvinyl chloride, vinyl chloride monomer, or cross laminated polyethylene. These materials are known to those of ordinary skill in the art and sheets of high strength characteristics are available from various high strength film manufacturing companies. As examples, polyethleneterephtalate ("PET") and polyethleneterephtalate glycol ("PETG") copolyester sheets are available as high strength extruded sheets from the Eastman Chemical Company of Kingsport, Tenn. Cross laminated polyethylene is available in a brand known as Valeron from Valeron Strength Films of Houston, Tex. Although these high strength sheet materials are presently preferred other high strength, monolithic extruded sheets of material are within the purview of the subject invention. Moreover, two or more of these materials may be combined to produce a monolithic or layered composition.

In a preferred embodiment the monolithic sheets or strips of material 112 and 120 are joined together as an operating unit by an intermediate or first layer of adhesive 126 having a first side 128 and a second side 130. The composition of the adhesive may be chosen from a number of commercially available materials as discussed above in connection with the embodiment of FIGS. 7 and 8.

The first adhesive layer 126 may be applied directly to the inner and outer surfaces of the monolithic sheets 112 and 120 during a manufacturing process or may be carried by a central substrate (not shown) which may be a porous spun bond polyester or Mylar. When a substrate is used the adhesive layer 126 is usually divided into two portions of approximately equal thickness.

A second layer of adhesive 132 and release layer 134 are similar to the second layer of adhesive 94 and release layer 102 of the embodiment of FIG. 8 attached at a second end 68 of the embodiment of the laminated load restraining strip 110 disclosed in FIG. 9. The length of the second layer of adhesive 132 and release layer 134 is less than or equal to approximately four feet from the second end of the load restraining 60. In a preferred embodiment the length of the second layer of adhesive 132 and release layer 134 is approximately three feet in length. The second layer of adhesive 132 has a first side 136 overlaying and adhering to the second side of the reinforcement material 118 and a second or outer side 138 for attachment to a side wall of a container. The second layer of adhesive may or may not include a substrate layer 140 as discussed above in connection with FIGS. 7 and 8.

Figure 10:
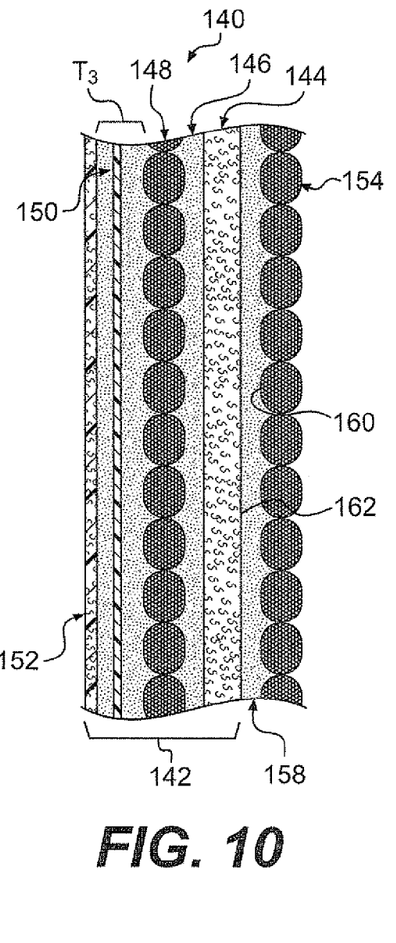
FIG. 10 is partial cross-sectional view similar to FIG. 8 and discloses another alternative detail of the interior structure of another preferred form of a restraining strip for use in connection with the invention.

FIG. 10 disclosed another alternative preferred embodiment of the invention. In this embodiment a partial cross-sectional view of a laminated load restraining strip 140 is shown which is similar to the laminated load restraining strip 60 of FIGS. 7 and 8 and similar to restraining strip 110 in FIG. 9. In this embodiment a portion 142 of the load restraining strip 140 is identical to the load restraining strip 60 disclosed and described in connection with FIGS. 7 and 8 and the description there is repeated here by reference as though set forth at length including a description of a spun bonded flexible first layer 144, a first layer of adhesive 146, a layer of reinforcement 148, a second short layer of adhesive 150 and a release layer 152 coextensive with the short three to four foot layer of the second adhesive 150.

In addition to the components 142 of the embodiment of FIG. 10 a second layer of reinforcement 154 similar in structure to layer 148, including parallel bundles of finer denier yarn, is attached coextensively to the spun bonded flexible layer 144 with a third layer of adhesive 158 having a first side 160 and a second side 162.

Figure 11:
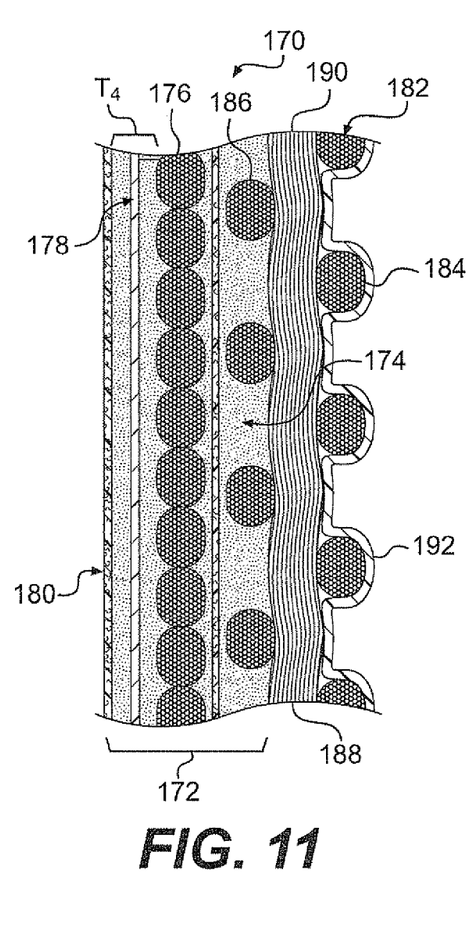
FIG. 11 is a partial cross-sectional view similar to FIG. 8 and discloses yet another alternative detail of the interior structure of another preferred form of a restraining strip for use in connection with the invention

FIG. 11 is yet another embodiment of a laminated load restraining strip 170 shown in partial cross-sectional detail similar to FIGS. 8-10. In this embodiment segment 172 is substantially the same as the embodiments of FIGS. 8 and 10 in the sense that a first adhesive layer 174 is similar to adhesive layers 76 and 146, a layer of reinforcement 176 is similar to layers of reinforcement 82 and 148 and a second, three to four foot, layer of adhesive 178 is similar to the second adhesive layers 94 and 150 of the embodiments of FIGS. 8 and 10. Finally a release layer of material 180 is coextensive with the second layer of adhesive 178 and is similar to release layer 102 and 152 of the embodiments of FIGS. 8 and 10.

A difference in the embodiment of FIG. 11 is the provision of a flexible strip 182 composed of longitudinally extending bundles 184 and 186 of a finer denier fiber as described above in reference to FIGS. 7 and 8 and in addition crossing strand bundles 188 which is woven across bundles 184 and 186 to form a flexible cross weave fabric 190 of bundles of finer denier fibers. An outer coating of Mylar 192 is applied over an outer first side of the cross-weave fabric layer 190 forming a first strip 182 of the laminated load restraining strip. In all other respects the embodiment of FIG. 11 is identical or similar to the embodiments of FIGS. 8, 9 and 10 and the description of those Figures is repeated by reference for completeness.

In the embodiments of the flexible restraining strips disclosed in connection with FIGS. 9, 10 and 11 the thickness $T_2$, $T_3$ and $T_4$ of the second adhesive layers 124, 150 and 178 respectively are each approximately between 1.6 and 3.0 millimeters and in a preferred embodiment are each approximately 2.1 millimeters in thickness. It has been determined that this thickness of the second adhesive layer provides an enhanced resistance to unintended peel of the adhesive away from the container side wall during transport while concomitantly permitting facile peeling removal of the restraining strip by hand following transport of the cargo.

Method of Applying and Operation of a Load Restraining Strips

Figure 12:
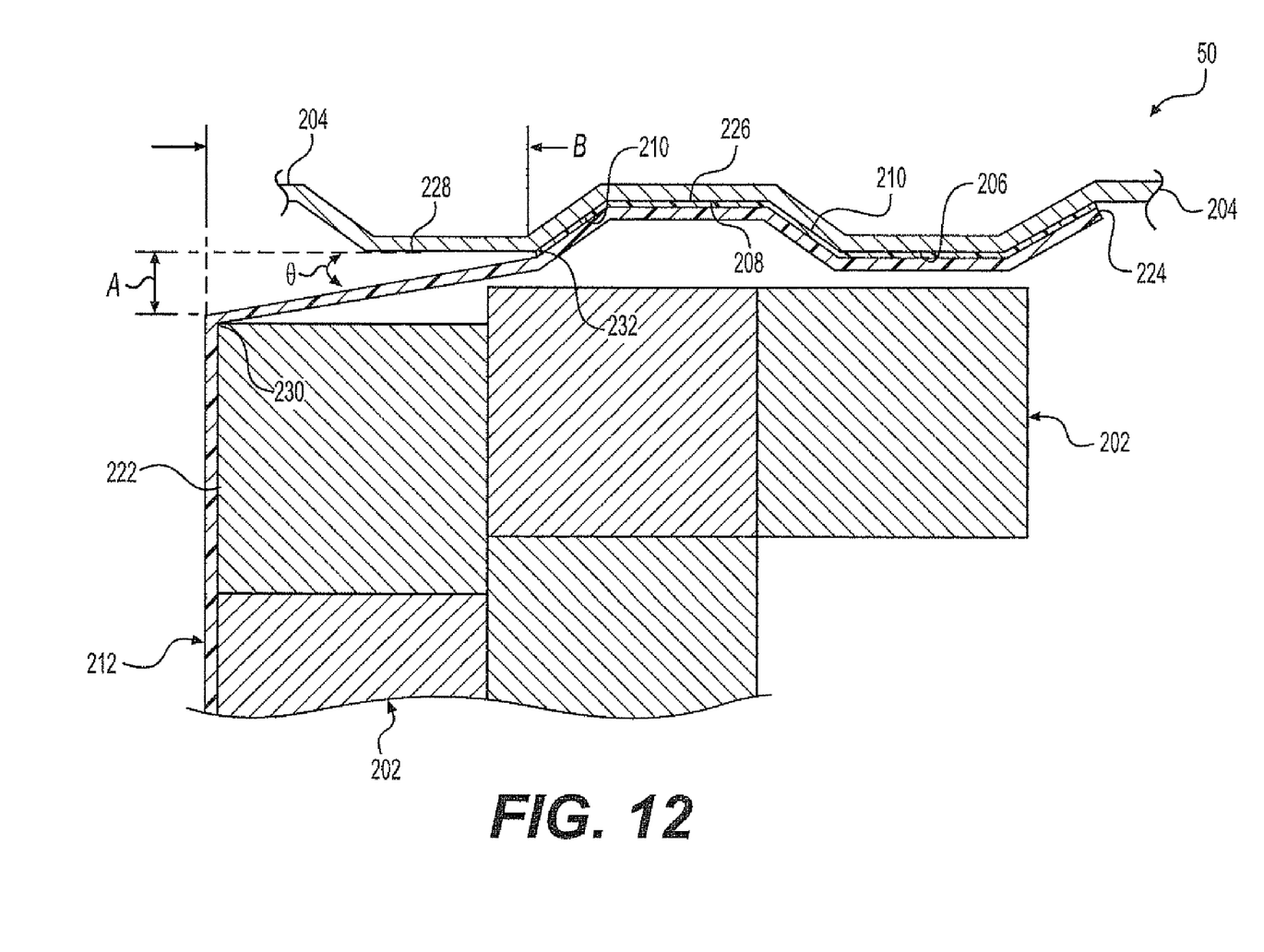
FIG. 12 is an enlarged detail view of a corner of an intermodal container with cargo contained within conventional boxes and an enhanced attachment to a lateral side wall of a container where a point of lateral wall contact of an adhesive portion of the load restraint system begins at a point of outward inflection of a container sidewall surface.

Referring now to FIG. 12 a partial cross-sectional view is shown of a corner of a transport container 50 such as shown in FIG. 4 with cargo represented by square containers 202. Lateral side walls 204 of the container 50 include land 206 and valley 208 surfaces connected by sloping angled surfaces 210. Cargo containers 202 are stacked on pallets and the pallets loaded with cargo are secured within the transport container 50 by the provision of laminated load restraining strips 212 of the type discussed and described above in connection with FIGS. 6-11.

A method of applying the load restraining strips 212 for use in securing cargo 202 within the transport container 50 includes the steps of providing a first load restraining strip 212 have a first end extending at least partially across a face 222 of a load and a second end 224 with an adhesive segment 226 beginning at the second end 224 of the load restraining strip 212 and extending along the strip 212 for three to four feet, as discussed above, to an attachment point 232. The self-adhering adhesive segment 226 is operable for releasable attachment of the load restraining strip 212 to the interior lateral wall surface 228 of the transport container 50 as discussed previously.

The thickness of the adhesive layer 226 approximately between 1.6 and 3.0 millimeters and in a preferred embodiment is approximately 2.1 millimeters in thickness, as discussed above to provide an enhanced resistance to unintended peel of the adhesive away from the container side wall during transport while concomitantly permitting facile peeling removal of the restraining strip by hand following transport of the cargo.

Before application of the second adhesive segment 226 of the load restraining strip 212 to the side wall 204 of the container 50 a shortest distance "A" is determined between an outer contact edge 230 of a load to be secured and an interior lateral wall surface 228 of the transport container 50 adjacent to the load contact edge 230.

Following determination of the distance "A", by measurement a forward edge 232, note FIGS. 6 and 12, of said self adhering portion 226 of said first load restraining strip 212 is placed onto a lateral wall surface of the transport container behind the contact point 230 of the load extended. The initial contact point 232 to the side wall 228 begins at a distance "B" along the lateral wall surface behind the contact edge 230 where $B \leq \cot \theta \cdot A$, and $\theta \leq 15°$. It has been determined that if the angle θ is maintained to be less than or equal to 15 degrees the shear contact of the load restraining strip 212 with the first lateral wall surface 228 of the container is enhanced and the length of the contact portion 226 of the strip 212 can be reduced to four feet or less and preferably three feet while maintaining operational and regulatory load restraining characteristics of the restraining system.

Figure 13:
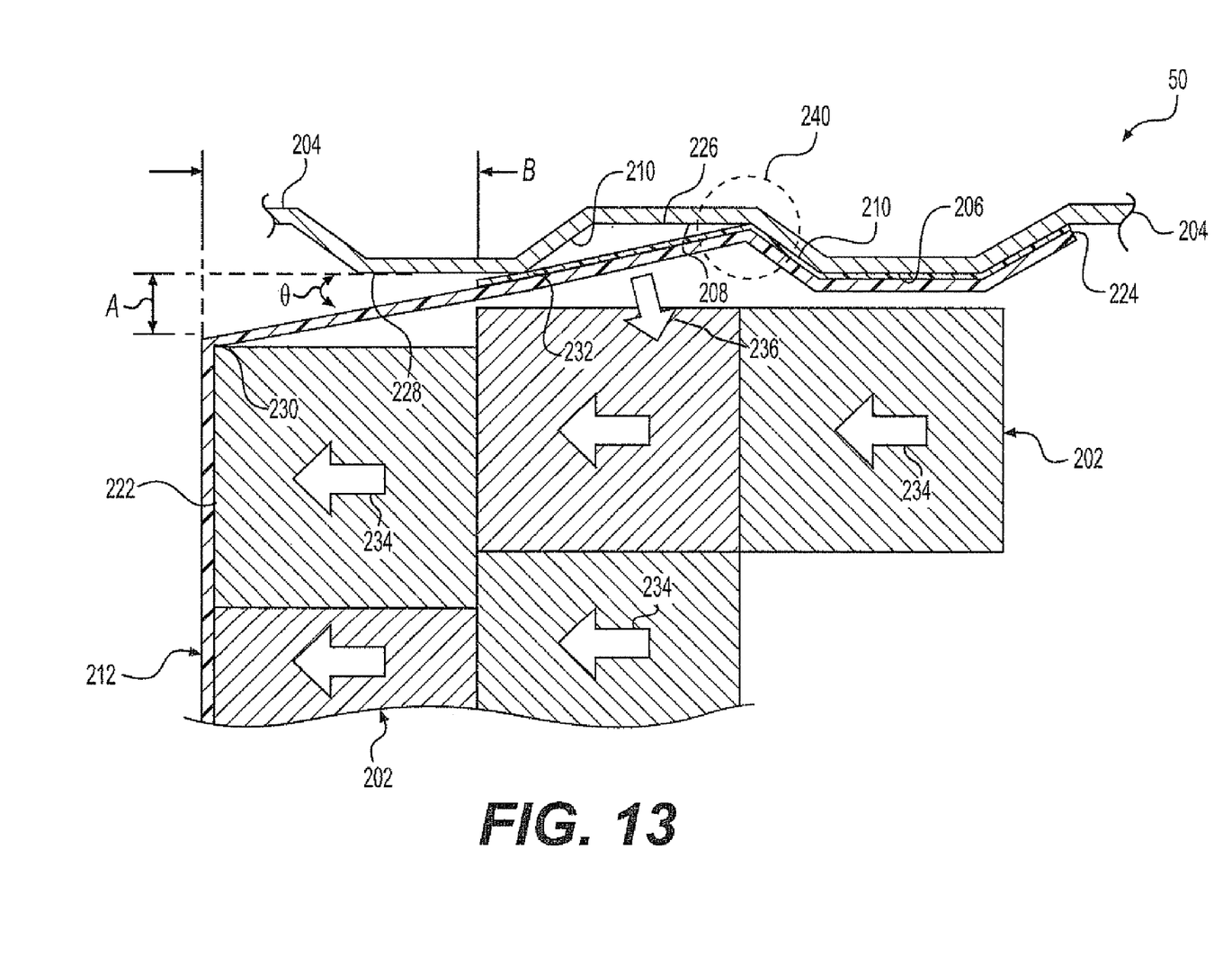
FIG. 13 is an enlarged detail view of a corner of an intermodal container with cargo as shown in FIG. 12 where tension on the load restraint strip serves to peel a central portion of the adhesive strip away from a sidewall valley portion of the container.

Referring now to FIG. 13 another partial cross-sectional view is shown of the same corner of the container 50 as disclosed in FIG. 12. In FIG. 13 the container load 202 occasionally exhibits a force on the restraining strip 212 in the direction of arrows 234. Longitudinal tension is then placed on the lateral portion of the restraining strip 212 which tends to create a peeling force in the general direction of arrow 236 within the valley of the attachment of the restraining strip to the container side wall. As seen in FIG. 13 the tendency will be to peel the adhesive layer 226 away from the valley of the side wall 204.

Figure 14:
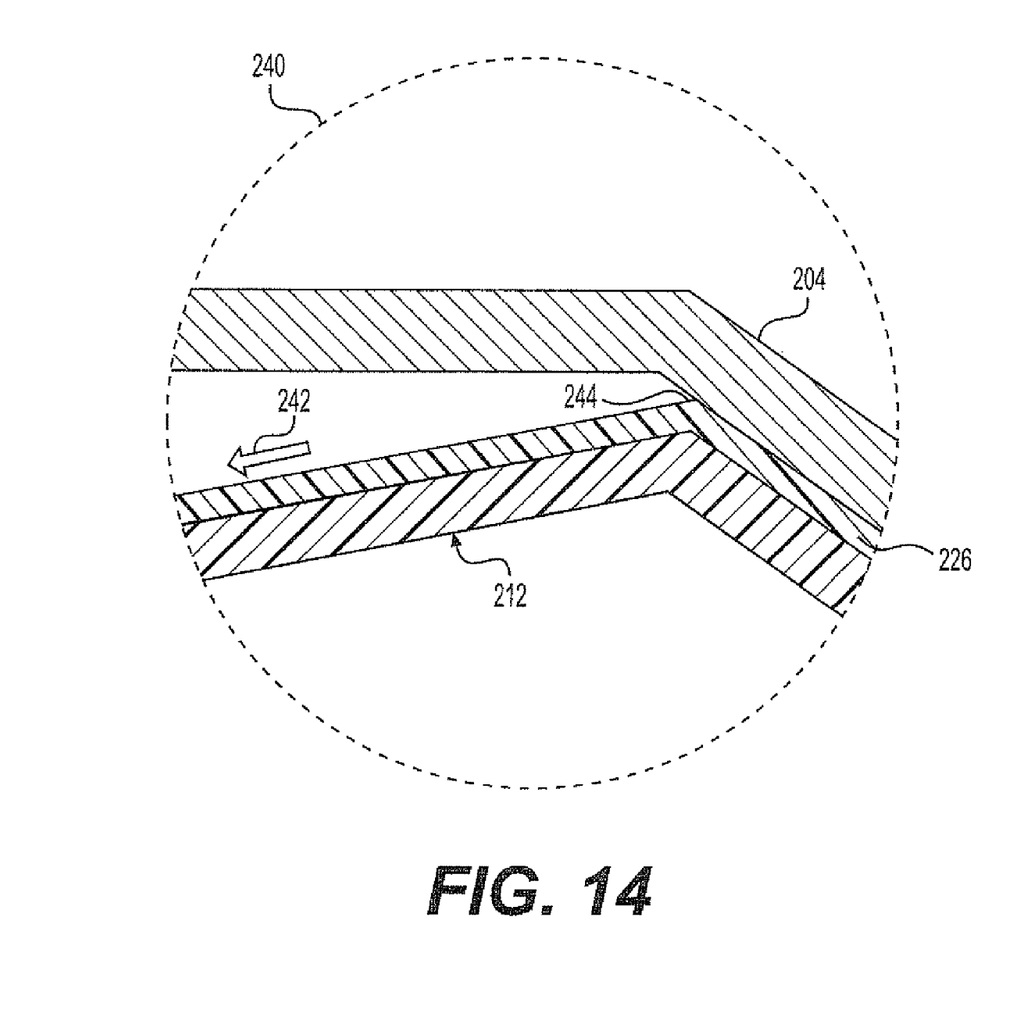
FIG. 14 is an enlarged detail view taken from the area of an imaginary circular section of FIG. 13 showing peeling of the load restraining strip away from a side wall surface of an intermodal container by axial pulling force applied to the load restraining strip.

Turning now to FIG. 14 there is a more detailed view of a circled portion 240 of the load restraining strip 212 as further axially loading is applied on the strip 212 in the direction of arrow 242. If the strip 212 advances to the position depicted in FIG. 14 the force 242 presents almost pure peeling of the adhesive away from the container side wall 204 at the inflection point 244. The subject invention prevents this from occurring by application of a thickness of adhesive with enhanced peel characteristics to prevent the initial peel away from a side wall valley inflexion in the general direction of arrow 236 as shown in FIG. 13 as discussed above.

In the subject application, and in the claims, the term 'transport container" is used in a generic sense for all forms of transport units that are capable of caring cargo. A transport container unit includes but is not limited to intermodal containers, air transport containers, railway cars—such as box cars, truck trailers, and the like having undulating or smooth side wall surfaces In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A laminated load restraining strip for use in securing cargo within a cargo transport container having a first lateral side wall surface and an opposing second lateral side wall surface subject to shifting forces during transport, said load restraint strip comprising:
   a flexible strip having a first side and a second side and a first end and a second end;
   a first layer of adhesive coextensively extending along and coating said second side of said flexible strip from said first end to said second end of said first layer of adhesive and having a first side of said first layer of adhesive in adhering contact with said second side of said flexible strip;
   a layer of reinforcement having a first side and a second side and being bound to said flexible strip by said first layer of adhesive with a first side of said first layer of reinforcement adhered to said second side of said first layer of adhesive;
   a second layer of adhesive extending along and coating the second side of said layer of reinforcement material from said second end of said load restraining strip to a position less than or equal to approximately four feet from said second end and having a first side of said second layer of adhesive in self-adhering contact with said second side of said layer of reinforcement material and the thickness of said second layer of adhesive being greater than approximately 1.6 millimeters and approximately less than 3.0 millimeters in thickness; and
   release material extending coextensively with and releasably adhered to said second side of said second layer of adhesive applied to said second side of said layer of reinforcement, wherein said release material may be removed from said second layer of adhesive on site and said load restraining strip releasably affixed to a side wall surface of the cargo transport container such that said load restraining strip may be used as a flexible securement element to secure cargo within the cargo transport container with enhanced peel strength characteristics.

2. A laminated load restraining strip for use in securing cargo within a transport container as defined in claim 1 wherein said second layer of adhesive comprises:
   a layer of adhesive having a thickness of approximately 2.1 millimeters in thickness.

3. A laminated load restraining strip for use in securing cargo within a transport container as defined in claim 2 wherein said second layer of adhesive extends:
   from said second end of said load restraining strip to a position equal to approximately between three and four feet from said second end of said load restraining strip.

4. A laminated load restraining strip for use in securing cargo within a transport container as defined in claim 2 wherein said second layer of adhesive extends:
   from said second end of said load restraining strip to a position equal to approximately three feet from said second end of said load restraining strip.

5. A laminated load restraining strip for use in securing cargo within a transport container as defined in claim 1 wherein said second layer of reinforcement comprises:
   a plurality of reinforcement strand bundles bound to said second layer of adhesive in a substantially parallel array and each of said strand bundles of reinforcement comprises a plurality of finer denier fibers of polyester reinforcement material.

6. A laminated load restraining strip for use in securing cargo within a transport container as defined in claim 1 wherein said layer of reinforcement comprises:
   a monolithic strip of plastic reinforcement material.

7. A laminated load restraining strip for use in securing cargo within a transport container as defined in claim 6 wherein said first flexible strip comprises:
   a monolithic strip of plastic material.

8. A laminated load restraining strip for use in securing cargo within a transport container as defined in claim 1 wherein said flexible strip comprises:
   a plurality of reinforcement strands bound to said first layer of adhesive.

9. A laminated load restraining strip for use in securing cargo within a transport container as defined in claim 1 wherein said first flexible strip comprises:
   a cross-weave layer of reinforcement material composed of substantially parallel longitudinal strands extending along the length of said load restraining strip and cross strands interwoven with said substantially parallel longitudinal strands to produce said cross-weave layer.

10. A laminated load restraining strip for use in securing cargo within a transport container as defined in claim 9 and further comprising:
    a pliant coating applied to an outer surface of said cross-weave material.

11. A laminated load restraining strip for use in securing cargo within a cargo transport container having a first lateral side wall surface and an opposing second lateral side wall surface, which cargo is subject to shifting forces during transport, said load restraint strip comprising:
    a first flexible strip having a first side and a second side and a first end and a second end;
    a first layer of adhesive coextensively extending along and coating said second side of said first flexible strip from said first end to said second end and having a first side of said first layer of adhesive in adhering contact with said second side of said flexible strip;
    a layer of reinforcement bound to said first flexible strip by said first layer of adhesive with a first side of said layer of reinforcement adhered to said second side of said first layer of adhesive;
    a second layer of adhesive extending along and coating a second side of said layer of reinforcement from said second end of said load restraining strip to a position less than or equal to approximately three to four feet from said second end of said strip and having a first side of said second layer of adhesive in self-adhering contact with said second side of said layer of reinforcement material and said second layer of adhesive being greater than approximately 1.6 millimeters and approximately less than 3.0 millimeters in thickness; and
    a release material extending coextensively with and releasably adhered to said second layer of adhesive applied to said second side of said layer of reinforcement, wherein said release material may be removed from said second layer of adhesive on site and said load restraining strip releasably affixed to a side wall surface of the cargo transport container such that said load restraining strip may be used as a flexible securement element to secure cargo within the transport container.

12. A laminated load restraining strip for use in securing cargo within a transport container as defined in claim 11 wherein said second layer of adhesive comprises:
    a layer of adhesive having a thickness of approximately 2.1 millimeters in thickness.

13. A laminated load restraining strip for use in securing cargo within a transport container as defined in claim 12 wherein:

said second layer of adhesive is approximately three feet in length.

14. A laminated load restraining strip for use in securing cargo within a transport container as defined in claim 12 wherein said second layer of reinforcement comprises:

a plurality of reinforcement strand bundles bound to said second layer of adhesive in a substantially parallel array and each of said strand bundles of reinforcement comprises a plurality of finer denier fibers of polyester reinforcement material.

15. A laminated load restraining strip for use in securing cargo within a transport container as defined in claim 1 wherein said layer of reinforcement comprises:

a monolithic strip of plastic reinforcement material.

16. A laminated load restraining strip for use in securing cargo within a transport container as defined in claim 15 wherein said first flexible strip comprises:

a monolithic strip of plastic material.

17. A laminated load restraining strip for use in securing cargo within a transport container as defined in claim 15 wherein said first flexible strip comprises:

a cross-weave layer of reinforcement material composed of substantially parallel longitudinal strands extending along the length of said load restraining strip and cross strands interwoven with said substantially parallel longitudinal strands to produce said cross-weave layer.

18. A laminated load restraining strip for use in securing cargo within a transport container as defined in claim 17 and further comprising:

a pliant coating applied to an outer surface of said cross-weave material.

* * * * *